Jan. 14, 1958 — A. H. HANSON — 2,819,809
HAND TRUCK BELT TIGHTENING ASSEMBLY

INVENTOR.
ALFRED H. HANSON
BY Mock + Blum
ATTORNEYS

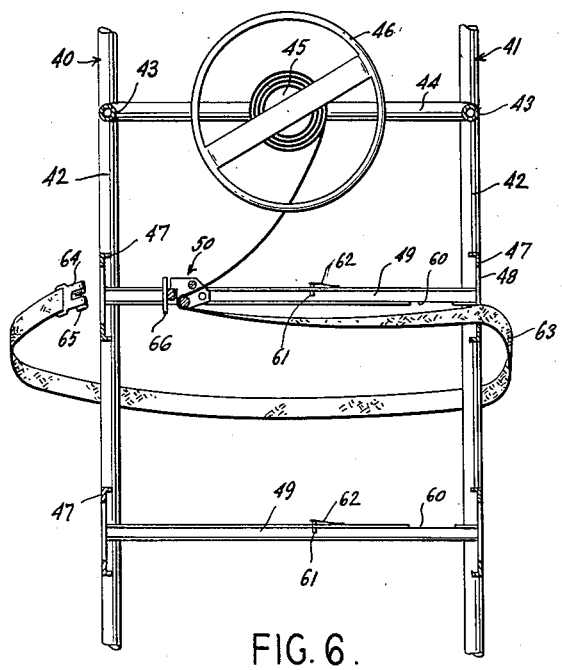

United States Patent Office 2,819,809
Patented Jan. 14, 1958

2,819,809
HAND TRUCK BELT TIGHTENING ASSEMBLY

Alfred H. Hanson, Garrison, N. Y., assignor to The Fairbanks Company, New York, N. Y., a corporation of New Jersey Application March 15, 1954, Serial No. 416,165

9 Claims. (Cl. 214—374)

My invention relates to improvements in belt-tightening assemblies for hand trucks and the like.

For the handling and transporting of large heavy objects such as refrigerators, cooking ranges and the like, a variety of hand trucks have been devised, many of these hand trucks having a belt for extension around the load in such a manner as to hold the load tightly against the truck frame. Provision of such a belt is intended to enable a single operator to load the truck by tightening the belt around the load while the truck is in an upright position and then tilting or breaking the truck rearwardly to an inclined operative position for rolling it and the load to their destination.

Since heavy loads subject the belt to heavy tensile strain which tends to stretch or elongate the belt in the act of breaking or pulling over the load, the simple hand-tightened belt and buckle arrangement has been found undesirable and several types of mechanical belt-tightening assemblies have been devised. Such assemblies are intended to permit the operator to tighten the belt initially to a maximum tension around the load and to re-tighten the belt during the transporting operation should the belt loosen or stretch. It will be appreciated that if the belt loosens or stretches around the load, a dangerous situation may arise because of improper leverage and back-lash when the operator restores the truck to its vertical or rest position.

The mechanical belt-tightening assemblies heretofore devised are generally of two types, in one of which an eccentric cam is used for tightening the belt, and in the other of which a ratchet is utilized for this purpose. Several difficulties have been encountered in the use of such arrangements, the most serious being the necessity for tightening the belt in the large fixed increments afforded by the ratchet or cam, so that the optimum tension on the belt for the particular load is often impossible to achieve, it being necessary to over-tighten the belt before the assembly can reach its holding or locking position. In addition, the construction of the assembly is generally such that it is impossible to adjust the belt vertically to position it at the centers of loads of various sizes. Further, no provision is made for storing the belt, so that when the belt is not in use it hangs loosely from the truck and must be wrapped around the truck frame when the truck is to be used without the belt.

According to the present invention, I provide a reel for storing the belt and also for winding up the belt to tighten it around a load. The reel works in automatic cooperation with a locking device including a pivotable buckle of a construction which enables the belt to pass therethrough in a direction to tighten it around the load, but which normally prevents the belt from passing therethrough in the opposite direction which would loosen it around the load. The assembly is of simple and extremely sturdy design eliminating the need for springs, cams, ratchets and other mechanisms which might be damaged in use or which could fray or damage the belt.

It is an object of my invention to provide a belt-tightening and locking assembly of the character described in which one end of the belt is adapted for removable attachment to the truck so that it may be conveniently drawn about the load and further may be adjusted vertically to extend around the center of the load, so that only a single length of belt is required for holding even the heaviest loads.

Another object of the invention is to provide an assembly of the character described in which a smooth and uniform tightening operation is afforded in place of tightening by fixed increments, thus achieving an optimum degree of belt tension around the load and at the same time avoiding the possibility of over-tightening the belt.

A further object of the invention is the provision of an assembly of the character described in which the belt take-up reel is located at the rear of the truck in a conveniently accessible position for operation to tighten the belt while the truck is actually in use.

A further object of the invention is the provision of an assembly of the character described in which the belt locking device may be so mounted as to apply tension to both ends of the belt section extending around the load.

Other objects and advantages of my invention will be readily apparent in the course of the following specification when taken in connection with the accompanying drawings, in which:

Fig. 5 is a vertical section through the center of a modified form of hand truck incorporating the invention;

Fig. 6 is a section along line 6—6 of Fig. 5;

Fig. 7 is a vertical section through the center of the locking device shown in Fig. 6; the locking device being shown in inoperative, non-holding position;

Fig. 8 is a section similar to that of Fig. 7, but showing the locking device in operative, holding position; and Fig. 9 is a top plan view of the locking device in its operative position of Fig. 8.

Figure 1:
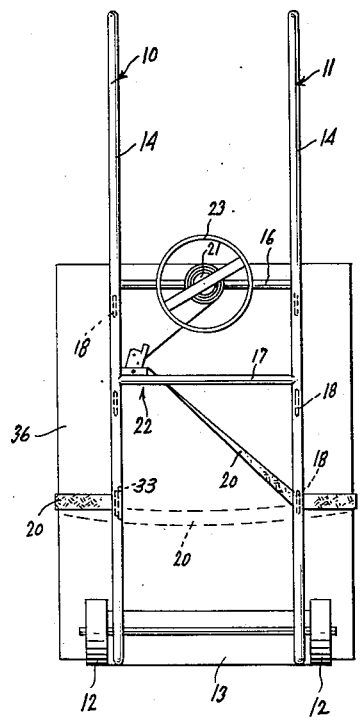
Fig. 1 is a rear elevation of a hand truck incorporating my invention, the hand truck being shown in a standing position of rest with a load attached thereto by means of the belt.

In the form of the invention shown in Figs. 1 through 4, the hand truck comprises a frame having a pair of side members or stringers 10 and 11 mounted upon wheels 12 and supporting at their bottom ends a forwardly extending platform or nose piece 13. Each of the stringers 10 and 11 comprises a pair of spaced tubular bars 14 joined at their top and bottom ends and also connected intermediate their ends by braces 15. The respective rear bars 14 of the stringers 10 and 11 are joined by a pair of spaced tubular cross bars 16 and 17. Each of the rearward longitudinal bars 14 of the stringers 10 and 11 have a plurality of metallic loops 18 shown in Figs. 1a and 2 which are suitably spaced along the lengths of said bars 14. These loops 18 are provided to serve as mounts or guides for the belt 20 as will be presently described in detail.

The belt 20 may be the usual webbed belt used in hand trucks of this type to encircle the load on the truck and hold the load firmly and securely against the hand truck frame. Means are provided for tightening the belt around the load and maintaining it in this tightening position, these means comprising a reel 21 and a locking member 22.

The reel 21 is rotatably mounted at the center of the uppermost cross bar 16 and has associated therewith a hand wheel 23 which may be manually grasped and turned for rotating said reel. As shown in Fig. 1, the reel 21 extends rearwardly from the cross bar 16 so that the hand wheel 23 is located in convenient position to be accessible from the rear of the hand truck.

Figures 1A, 2:
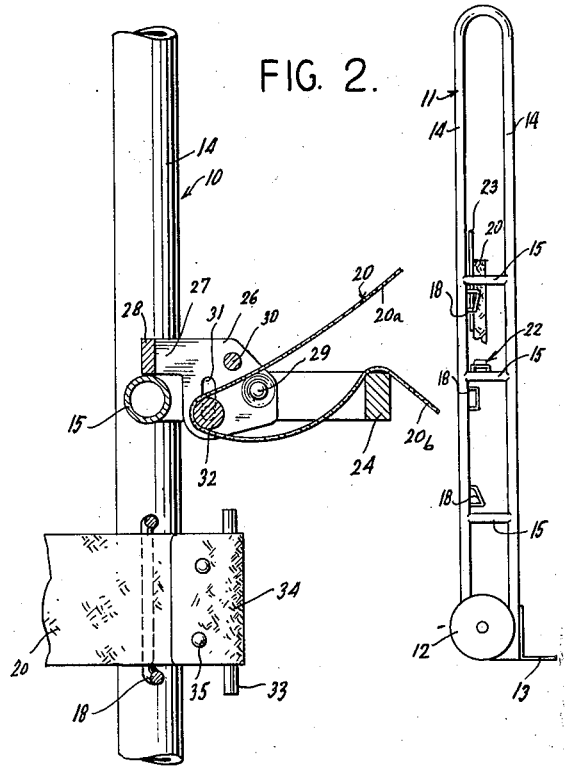
Fig. 1a is a side elevational view of the truck shown in Fig. 1 with the load removed.
Fig. 2 is a vertical section taken centrally through the locking device of the truck, the locking device being shown in its inoperative or non-holding position.
Figure 3:
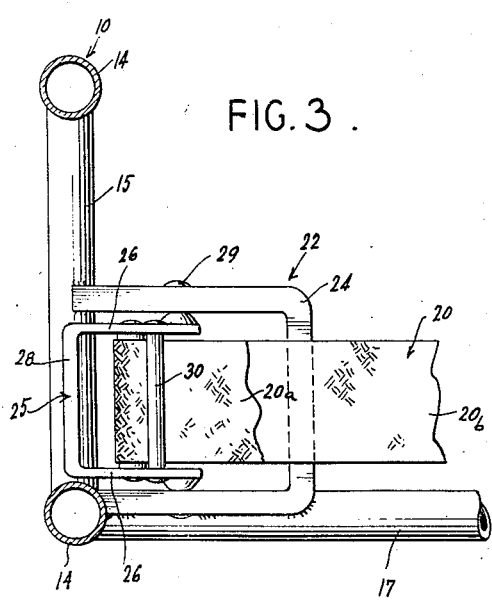
Fig. 3 is a top plan view of the locking device in its non-holding position of Fig. 2.

The locking member 22 comprises a U-shaped frame or yoke 24 of heavy metal which is rigidly fixed to a brace 15, a cross bar 17 and one of the rearwardly longitudinal bars 14 as shown in Fig. 3, by welding or the like. The locking member 22 also comprises a generally U-shaped buckle member 25 which comprises a pair of parallel side plates 26 each having a forwardly projecting extension 27, the extension being joined by an integral end plate 28. The side plates 26 are each connected adjacent their rear edge to the respective arm of the U-shaped frame 24 by a rivet 29, the rivets serving as the pivotal axis of the buckle member 25. A stationary rod or bar 30 extends between the side plates 26 of the buckle member 25, the rod being fixedly secured at its ends to said side plates. As shown in Fig. 2, this rod 30 is located above and forwardly of the pivot points 29 when the buckle member 25 is in a horizontal positoin. Also located forwardly of said pivot points and laterally alined therewith are elongated slots 31 in which the ends of a roller 32 are mounted for rotation and also for longitudinal sliding movement between the ends of said slots 31.

One end of the belt 20 is secured to the hub of reel 21, the belt then extending through the buckle member 25, beneath the rod 30, around the roller 32 and over the closed end of the U-shaped frame or yoke 24 as may be clearly seen in Fig. 2. The belt then continues through a selected loop 18 in the stringer 11, as shown in Fig. 1, across the front of the truck and is finally connected to a selected loop 18 in the stringer 10. This final connection is accomplished by drawing the free end of the belt through said loop 18 and then inserting a holding pin 33 through a loop 34 formed in the end of the belt and held by rivets 35. Since the pin 33 is larger than the metal loop 18, it prevents the end of the belt to be withdrawn through said loop 18. In the vicinity of the locking member 22, therefore, a section or length of belt 20a extends from the reel 21 to the roller 32 while another length or section 20b of the belt extends from one of the guide loops 18 to the roller 32.

Fig. 2 shows the inoperative or non-holding position of the locking member 22 in which the buckle member 25 is disposed with the end plate 28 resting upon the brace 15, the extension 27 horizontal, the rod 30 located above and forwardly of the rivet 29 and the roller 32 located below and forwardly of said rivet 29. In this position the belt may turn freely about the roller 32 being entirely unobstructed by the rod 30 so that the belt 20 may be withdrawn from the reel 21 and extended around a load such as the carton 36 shown in Fig. 1. In withdrawing the belt from the reel, the belt will pass freely through the buckle 25 passing beneath the rod 30 and around the rotatable roller 32.

Figure 4:
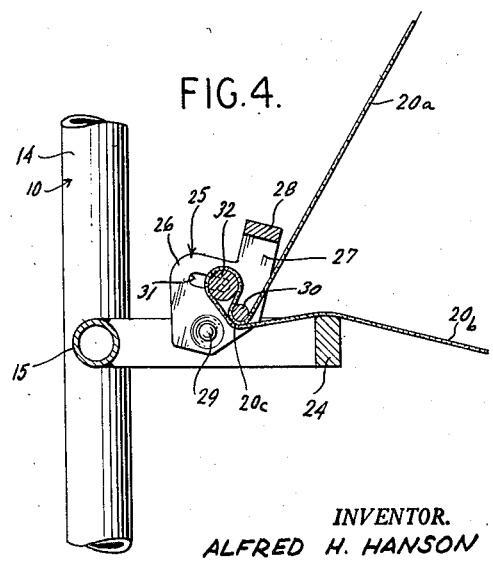
Fig. 4 is a vertical section similar to Fig. 2 but showing the locking device in its operative holding position.

To wind the belt on the reel 21 and thereby tighten the belt around the load 36, the hand wheel 23 is turned until the slack in the belt is taken up, at which time the tight loop formed around the roller 32 exerts an upward pressure on said roller along an axis which extends above the pivot 29 thus causing the buckle member 25 to pivot in a clock-wise direction through an angle of approximately 90° to its operative or holding position of Fig. 4. In this position the roller 32 has been drawn to the opposite end of the slot 31 so that it is now closely proximate to the fixed rod 30. In addition, the roller 32 is now located above the rod 30. The belt section 20a extends downwardly at an angle from the reel 21 and forms a bight beneath the rod 30 continuing from said rod to said roller 32. The belt section 20b which extends upwardly from the loop 18 of stringer 11 passes over the U-shaped frame 24, then passes beneath the rod 30 forming a shallower bight abutting the bight of the belt section 20a and then extends to the roller 32 at which it joins the section 20a. The frictional contact between the belt sections which form the bights located beneath the rod 30 and are indicated by numeral 20c in Fig. 4, is of sufficient force to prevent the belt from being pulled downwardly from the buckle 25; that is to say once the load has been adjusted and the locking member 22 is in its holding position of Fig. 4, it is impossible for the belt to loosen or slacken around the load. However, it is still possible to pull the belt section 20a upwardly from the buckle in order to further tighten the belt around the load by merely turning the hand wheel 23.

When the hand truck is not in use, the entire belt 20 may be wound around the reel 21 so that it is conveniently stored in an accessible position. Alternately, the belt may be left threaded through the locking member 22 and attached to selected guide loops 18, all of the slack being taken up on the reel 21 so that the unwound belt sections tightly embrace the truck frame. In either event, the belt is conveniently out of the way, and the truck may be used without the belt in the manner of an ordinary hand truck.

When it is desired to bind a load to the truck frame, a length of belt 20 is withdrawn from the reel 21, extended around the load and through the suitable loop guides 18 and its end secured by means of the holding pin 33. In this connection, it will be observed that a plurality of the loop guides 18 are provided on each of the stringers 10 and 11 so that the belt may be extended around the approximate center of the load for a better holding effect no matter what the height of the load may be.

After the belt is assembled around the load and its end attached to the frame, the hand wheel 23 is rotated to wind the excess belt on the reel 21 and thus take in the slack of the belt. The belt at this time may pass freely through the locking member 22 since the buckle 25 is in its inoperative or non-holding position of Fig. 2. When the slack is taken in and the belt tightens around the load, the belt section 20b leading from the load is under tension and further turning of the wheel 23 pivots the buckle 25 automatically to its holding or operative position of Fig. 4 and also causes the roller 32 to move to the end of the slot adjacent the rod 30. The buckle 25 is retained in this operative position by the tension of the belt section 20b which pulls the roller 32 toward the right as viewed in Fig. 4, or in a clockwise direction above the pivot 29, thereby urging the buckle in a direction in which the rod 30 presses the belt sections together.

It will be noted that in the operative or holding position of the locking member shown in Fig. 4, the upper belt section 20a forms a bight of an acute angle around the lower peripheral surface of the fixed rod 30, while the lower belt section 20b forms a bight of an obtuse angle below the rod 30 which abuts the under-surface of the belt section 20a in the vicinity of rod 30. Thus, when the belt 20 is tightened around the load, the tension on the lower belt section 20b presses it firmly against the upper belt section 20a and also urges the buckle 25 in a clockwise direction to its holding position. The frictional contact between the bights 20c of belt sections 20a and 20b is sufficient to prevent the belt section 20b from being drawn away from the buckle 25, that is to say, the belt 20 cannot loosen around the load. This locking action of the buckle 25 is performed independently of the reel 21, so that the belt section 20a leading upwardly away from the buckle 25 may hang loosely without interfering with the holding action of the locking member 22. On the other hand, the greater the tension of the belt section around the load, the greater is the frictional locking action provided by the buckle.

After the belt is tensioned sufficiently to bring the locking member to its holding position, the belt may be further tightened to its optimum tension around the load by merely turning the hand wheel 23 further. As the belt is wound further around the reel 21 it is drawn upwardly through the buckle 25, although the locking member 22 still operates to prevent the belt from slipping back through the buckle, due to the increased tension on section 20b which becomes effective immediately upon release of reel 21. This tightening movement of the belt is permitted since the reel 21 draws upwardly on the belt section 20a drawing said section 20a around the smooth surface of the rod 30. This upward force on belt section 20a is also transmitted to the rod 30 which is above and to the right of the pivot 29, as viewed in Fig. 4, so that the buckle 25 is urged in a counter-clockwise direction away from its holding or operative position, easing the frictional contact between the belt section bights 20c beneath the rod 30. The holding action on the belt is therefore eased and the reel force or tightening force is effective to draw the belt upwardly through the buckle 25. When tension of the reel 21 is released, the locking member 22 again assumes its maximum holding position.

It will thus be seen that the belt may be tightened in a smooth continuous manner without resort to the usual fixed increment of tightening and that further since the tightening is accomplished directly by the reel 21, the operator is afforded a "feel" of the tightening operation through the hand wheel, so that over-tightening and consequent damage to the load is avoided. Further, when the optimum tension on the belt is achieved and the reel is released, the locking member 22 becomes immediately effective to lock the belt from further movement with minimum of back-lash.

To release the belt and permit it to be loosened around the load, it is only necessary for the operator to pivot the buckle 25 manually back to its inoperative or non-holding position of Fig. 2. This pivoting movement lifts the fixed rod 30 away from both belt sections 20a and 20b and enables the belt to be drawn freely about the roller 32.

The slots 31 are desired since they permit the roller 32 to drop to the bottom thereof in the non-locking position of Fig. 2 so that the belt section 20a is entirely free of the fixed rod 30 and may be easily drawn around the roller 32.

In the embodiment of Figs. 1–4 just described, the belt is attached at one end to the reel and at the other end to a fixed portion of the frame. Consequently, the tightening action is accomplished only at one end of the belt or from one side of the load. This arrangement is preferable for relatively light loads since it is simple in construction and application and has the further advantage of flexibility in that a wide variation of belt positions along the truck frame may be achieved by means of the guides 18. However, when a heavy load or a large object with sharp corners is to be transported requiring extreme belt tension on both sides of the load, a modified form of truck may be employed. In such form of truck, shown in Figs. 5–8, a similar belt locking member is utilized, except that it is movably mounted on the truck frame and is adapted to hold the free end of the belt.

The truck frame of the alternate embodiment shown in Figs. 5–9, comprises a pair of stringers 40 and 41 each formed of tubular parallel vertical bars 42 joined together at their tops and bottoms and also at their upper ends by tubular braces 43. These braces 43 are connected by a tubular cross bar 44 upon which the belt reel 45 and its hand wheel 46 are mounted.

Also connecting the vertical bars 42 of each stringer 40 and 41 are a plurality of flat plates 47 each having an elongated slot 48 which acts as a belt guide. Between each parallel pairs of plates 47 are a pair of spaced channel irons 49 which act as rails for movable mounting of the locking member 50. The locking member 50 is identical in all respects to the locking member 22 shown in Figs. 1–4 except that the side plates 54 of its buckle 52 are pivotally mounted at the ends of the arms of the U-shaped frame 53. As shown in Figs. 8 and 9, the arms of the U-shaped frame 53 are spaced and sized to slide within the channels of irons 48 so that the locking member 50 may move laterally between the frame stringers 40 and 41. The buckle 54 is identical to the buckle 25 previously described, being mounted upon pivots 55 and having an end plate 56, roller 57 slidable within the slots 58, and a fixed rod 59.

In order to enable the belt to be extended around the centers of different sized loads, the locking member 50 is adapted to be mounted between either of the two pairs of channel irons 49. For this purpose the channel irons of each pair have cut-away portions 60, shown in Fig. 6, at one end through which the U-shaped frame 53 may be withdrawn or inserted between the channel irons. In addition, at least one of the channel irons of each pair is provided with a releasable stop pin 61 mounted upon spring 62, the pin 61 being urged by said spring within the channel to prevent the locking member 50 from accidently sliding far enough to fall through the opening 60.

The belt 63 is similar to belt 20 in the embodiment of Figs. 1 to 4 except that at its free end there is attached a clasp 64 having bent terminal fingers 65. The U-shaped frame 53 is provided with a post 66 to which the end of the belt 63 may be removably attached by means of the bent clasp fingers 65, shown in Fig. 8.

One end of the belt 63 is attached to the reel 45 upon which the greater portion of the belt length is normally wound. When it is desired to use the assembly the free end of the belt is drawn through a suitable slot 48 in the stringer 41, is drawn around the load, is then drawn through the opposite slot 48 in the stringer 40, and the clasp 64 is attached to the post 66 of the locking member 50. Since the U-shaped frame 53 is freely movable in the horizontal track formed between the channel irons 49, the yoke is then manually drawn toward the stringer 40 and held closely adjacent to said stringer 40 while the reel 46 is turned to wind up the excess belt and until a slight tension on the belt is encountered. Continued turning of the reel 45 then produces a simultaneously tightening of the belt around the load from both sides of the truck after the loose or slack belt has been taken up and the usual belt tension occurs. When the belt is tensioned around the load and is continued to be drawn through the buckle 52, the belt tension against the roller 57 and post 59 will cause the locking member 50 to slide on its track away from the stringer 40 and toward the stringer 41. As long as tension is applied by turning the reel, the belt tension applied to the post 66 by the free end of the belt will be in excess of the belt tension between the reel 45 and the buckle 52 (the assembly operating in the manner of a single movable pulley) and will exceed the belt tension from the opposite truck side due to the friction around the load. However, when the reel is released, the belt tension will be equal from each side of the truck.

As shown in Fig. 6, an acute angle is described by the belt section extending from the reel 45 to the buckle 52 and then to the guide slot 48 located horizontally opposite the buckle. As the belt is tightened, the U-shaped frame 53 and buckle 52 move toward the center of the truck frame causing this belt angle to be less acute. Also, as the belt mass or diameter on the reel 45 diminishes, this angle also lessens in acuteness. As the angle becomes less acute, there is less tendency for the belt tension to move the locking member 50 toward the center of the truck frame. In addition, the stop pin 61 operates to prevent the locking member from passing the center of the truck frame after which point the angle of the belt section extending from the buckle to the reel 45 would cause the buckle 52 to pivot out of its locking position.

In actual use the U-shaped frame 53 is seldom required to travel more than the distance of two to three inches, whereas the stop pin 61 is positioned to permit a travel of approximately 5 to 6 inches.

The drawings are substantially to scale and reference is made thereto for further disclosure.

As shown in Figs. 7 and 8, the locking action of the locking member 50 operates in the same manner as previously described in connection with Figs. 1 to 4, the buckle 52 being effective to permit the belt to be drawn upwardly through the buckle onto the reel 45 but to prevent the belt from slipping back through the buckle as long as said buckle is in its operative position of Fig. 8.

While preferred embodiments of the invention have been shown and described herein, it is obvious that numerous additions, changes and omissions may be made in the invention without departing from the spirit and scope thereof.

I claim:

1. In a hand truck having a frame, a retaining belt for binding a load to said frame, guide means on said frame for guiding an intermediate portion of said belt around said load, means on said frame for tightening said belt portion around said load and connected to one end of said belt, the other end of said belt having means for attachment to the frame, and locking means mounted on said frame between said tightening means and said guide means for locking the belt in tightened position automatically upon actuation of said tightening means, said locking means including a pivoted member having a pair of rods, said belt being threaded through said locking means and forming a loop therein around the first of said rods, the other rod being offset from a line connecting the first rod and the pivotal axis of the pivoted member, said pivoted member being movable, by tension of said loop on said first rod when said belt portion is tightened about said load, to a locking position in which both rods engage and retain said belt.

2. In a hand truck having a frame, a retaining belt for binding a load to said frame, guide means on said frame for guiding an intermediate portion of said belt around said load, means on said frame connected to one end of said belt for tightening said intermediate belt portion around said load by winding up the connected end portion of the belt, means for coupling the other end of said belt to said frame, and locking means mounted on said frame between said tightening means and said guide means for locking the belt in tightened position automatically upon actuation of said tightening means, said locking means including a pivotally movable buckle having a pair of rods, the belt forming a loop around a first of said rods, the other rod being offset from a line connecting the first rod and the pivotal axis of said buckle, the buckle being movable by tension of said loop on said first rod when the tightening means is actuated to tighten the belt portion about said load, between a non-locking position in which the second rod is free of said belt, and a locking position in which said second rod forms a bight in the belt sections leading from the loop around said first rod, pressing the belt sections frictionally together and thereby maintaining the intermediate belt portion tensioned about said load.

3. In a hand truck having a frame, a retaining belt for binding a load to said frame, guide means on said frame for guiding an intermediate portion of said belt around said load, means on said frame connected to one end of said belt for tightening said intermediate belt portion around said load, means for connecting the other end of said belt to said frame, and locking means mounted on said frame between said tightening means and said guide means for locking the belt in tightened position automatically upon actuation of said tightening means, said locking means including a support member, and a buckle pivotally mounted on said support member and having a pair of rods, the belt forming a loop around a first of said rods with one belt section leading from said loop to said tightening means and another belt section leading from said loop to said guide means, the second of said rods being offset from a line connecting said first rod and the pivotal axis of said buckle, said buckle being movable by tension of the belt portion tightened around said load on actuation of said tightening means from a normal non-locking position in which the second rod is free of said belt, to a locking position in which said second rod forms a bight in the belt sections leading from the loop around said first rod adjacent said loop, pressing the belt sections frictionally together and thereby maintaining the intermediate belt portion tensioned about said load.

4. In a hand truck having a frame, a retaining belt for binding a load to said frame, guide means on said frame for guiding an intermediate portion of said belt around said load, means on said frame connected to one end of said belt for tightening said intermediate belt portion around said load, means for coupling the other end of said belt to said frame and locking means mounted at one side of said frame between said tightening means and said guide means for locking the belt in tightened position automatically upon actuation of said tightening means, said locking means including a support mounted on the frame, and a buckle pivotally mounted on said support and having a pair of rods, the belt forming a loop around a first of said rods with one belt section leading from said loop angularly toward the center of said frame to said tightening means and another belt section leading from said loop to said guide means at the opposite side of said frame, the second of said rods being offset from a line connecting said first rod and pivotal axis of said buckle, the buckle being pivotable between a non-locking position in which the second rod is free of said belt, and a locking position in which said second rod forms a bight in the belt sections leading from the loop around the first rod, adjacent said loop.

5. In a hand truck having a frame, a retaining belt for binding a load to said frame, guide means on said frame for guiding an intermediate portion of said belt around said load, means on said frame connected to one end of said belt for tightening said intermediate belt portion around said load, means for coupling the other end of said belt to said frame and locking means mounted at one side of said frame between said tightening means and said guide means for locking the belt in tightened position automatically upon actuation of said tightening means, said locking means including a buckle carrying a laterally-extending roller and a fixed rod parallel thereto, the belt forming a loop around said roller with an upper belt section leading from said loop angularly toward the center of said frame to said tightening means and a lower belt section leading from said loop to said guide means at the opposite side of said frame, said sections diverging in leaving said buckle, the buckle being pivotable between a non-locking position in which the fixed rod is free of said belt, and a locking position in which said rod abuts the upper belt section adjacent said roller and presses said upper belt section against said lower belt section to form a bight in said belt sections.

6. In a hand truck having a frame, a retaining belt for binding a load to said frame, guide means on said frame for guiding an intermediate portion of said belt around said load, means on said frame connected to one end of said belt for tightening said intermediate belt portion around said load, means for coupling the other end of said belt to said frame and locking means mounted at one side of said frame between said tightening means and said guide means for locknig the belt in tightened position automatically upon actuation of said tightening means, said locking means including a buckle mounted by pivots for movement between a substantially horizontal, non-locking position and a substantially vertical locking position, the buckle carrying a roller and a fixed rod having respective axes which are parallel to the pivotal axis of said buckle, the roller being located below said fixed rod and both said roller and rod being located on the side of the pivots proximate to the adjacent side of the frame when said buckle is in its non-locking position, said belt forming a loop around said roller with an upper belt section leading from said loop angularly toward the center of said frame to said tightening means and a lower belt section leading from said loop to said guide means at the opposite side of said frame, said sections diverging in leaving said buckle, the fixed rod being free of said belt in the non-locking position of the buckle, and moving to the side of the pivot adjacent the center of the frame below said fixed rod and into abutment with the upper belt section adjacent said roller to press said belt sections together and form a bight therein when said buckle is pivoted to its locking position.

7. The combination according to claim 6 in which a carrier is mounted on said frame for sliding movement laterally thereof, said buckle is pivoted on said carrier, and the means for coupling said other end of the belt to the frame includes said carrier.

8. The combination according to claim 6 in which a U-shaped yoke is carried by said frame, said buckle being pivoted on said yoke, said truck frame having a pair of lateral tracks extending across the width thereof, said yoke being slidably mounted between said tracks, the means for coupling the other end of the belt to the frame including said yoke.

9. In a hand truck having a frame, a retaining belt for binding a load to said frame, guide means on said frame for guiding an intermediate portion of said belt around said load, a reel mounted at the upper rear central portion of the frame and having a hand wheel for turning thereof, one end of the belt being connected to said reel whereby the belt may be tightened around said load by winding the excess belt on said reel, the other end of said belt having means for attachment thereof to said frame, and locking means mounted on said frame between said reel and said guide means for locking the belt in tightened position automatically upon tightening of said belt around said load by means of said hand wheel, said belt extending from said reel downwardly and angularly through said locking means to said guide means and then around said load, the locking means including a movable body member carrying a first member engageable by said belt and a locking member normally spaced from the belt when the belt is slack, said body member being movable, by tension of the belt against said first member when the belt is tightened, to a locking position in which the second member engages and frictionally grasps the belt.

References Cited in the file of this patent

UNITED STATES PATENTS

| | | |
|---|---|---|
| 84,450 | Weaver | Nov. 24, 1868 |
| 1,956,903 | Kline | May 1, 1934 |
| 2,165,603 | Yeats | July 11, 1939 |
| 2,607,606 | Millen | Aug. 19, 1952 |
| 2,623,760 | Fornelius | Dec. 30, 1952 |